United States Patent
Mattison et al.

(10) Patent No.: US 11,297,191 B2
(45) Date of Patent: Apr. 5, 2022

(54) SYSTEM FOR SELECTIVE EVENT-BASED DOCUMENT SCANNING AND CAPTURED IMAGE STORAGE

(71) Applicant: BANK OF AMERICA CORPORATION, Charlotte, NC (US)

(72) Inventors: Paul Martin Mattison, Sherrills Ford, NC (US); Matthew Edward Williams, Frisco, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 122 days.

(21) Appl. No.: 16/577,145

(22) Filed: Sep. 20, 2019

(65) Prior Publication Data

US 2021/0092237 A1    Mar. 25, 2021

(51) Int. Cl.
*H04N 1/00* (2006.01)
*G07F 19/00* (2006.01)

(52) U.S. Cl.
CPC ....... *H04N 1/00092* (2013.01); *G07F 19/209* (2013.01); *H04N 1/0009* (2013.01); *H04N 1/00018* (2013.01); *H04N 1/00037* (2013.01); *H04N 1/00087* (2013.01); *H04N 1/00631* (2013.01)

(58) Field of Classification Search
None
See application file for complete search history.

(56) References Cited

U.S. PATENT DOCUMENTS

| | | | |
|---|---|---|---|
| 7,383,227 B2 | 6/2008 | Weinflash et al. | |
| 7,386,511 B2 | 6/2008 | Buchanan et al. | |
| 7,440,924 B2 | 10/2008 | Buchanan et al. | |
| 8,191,777 B2 | 6/2012 | Davila et al. | |
| 8,235,282 B2 | 8/2012 | Davila et al. | |
| 8,381,975 B2 | 2/2013 | Davila et al. | |
| 8,403,209 B2 | 3/2013 | Davila et al. | |
| 8,444,050 B2 | 5/2013 | Davila et al. | |
| 8,608,055 B1 | 12/2013 | Carpenter et al. | |
| 10,134,019 B2 | 11/2018 | Pigg et al. | |
| 10,223,680 B2 | 3/2019 | Pigg et al. | |
| 2005/0203846 A1* | 9/2005 | Noguchi | G06Q 20/1085 705/42 |
| 2009/0173781 A1* | 7/2009 | Ramachandran | G06Q 20/3276 235/379 |

(Continued)

FOREIGN PATENT DOCUMENTS

JP    2011234130 A   * 11/2011

*Primary Examiner* — Fan Zhang
(74) *Attorney, Agent, or Firm* — Moore & Van Allen PLLC; R.W. McCord Rayburn (57) ABSTRACT

A system for selective document scanning and storage is provided. The system comprises: a memory device with computer-readable program code stored thereon; a communication device connected to a network; and a processing device, wherein the processing device is configured to execute the computer-readable program code to: receive a document via a user device comprising an image capturing device configured to capture an image of the document; determine an error with the document; in response to determining the error with the document, trigger transmission of a signal to the image capture device; and modify a document image capture based on receiving the signal at the image capture device.

20 Claims, 7 Drawing Sheets

(56) References Cited

U.S. PATENT DOCUMENTS

| | | | |
|---|---|---|---|
| 2010/0250418 A1* | 9/2010 | Schrick | G06Q 40/00 705/35 |
| 2013/0043106 A1* | 2/2013 | Iizuka | B65H 29/58 198/570 |
| 2014/0037184 A1* | 2/2014 | Gorski | G07D 7/20 382/138 |
| 2014/0229002 A1* | 8/2014 | Graef | G07F 19/202 700/231 |
| 2015/0348184 A1 | 12/2015 | Rossmann et al. | |

* cited by examiner

COLLECT THE DOCUMENT USING A MOTORIZED DOCUMENT RECEIVER DURING AN INTERACTION
710

HOLD THE DOCUMENT IN THE DOCUMENT RECEIVER DURING THE INTERACTION, WHEREIN HOLDING THE DOCUMENT COMPRISES STOPPING THE MOTOR OF THE DOCUMENT RECEIVER
720

IN RESPONSE TO DETERMINING THE ERROR WITH THE DOCUMENT, CONTROL THE MOTOR TO RETURN THE DOCUMENT HELD IN THE DOCUMENT RECEIVER TO THE USER
730

DETERMINE THAT A RETURNED DOCUMENT HAS NOT BEEN COLLECTED FROM THE DOCUMENT RECEIVER
740

COLLECT AND STORE THE RETURNED DOCUMENT
750

FIG. 7

SYSTEM FOR SELECTIVE EVENT-BASED DOCUMENT SCANNING AND CAPTURED IMAGE STORAGE

BACKGROUND

Scanning and processing of collected documents, especially for large-scale entities, may require a significant number of dedicated resources. As such, there is a desire to reduce required resource usage to a minimum. Therefore, there exists a need for an improved system for selectively collecting, scanning, and storing collected documents.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system for selective document scanning and storage is provided The system comprises: a memory device with computer-readable program code stored thereon; a communication device connected to a network; and a processing device, wherein the processing device is configured to execute the computer-readable program code to: receive a document via a user device comprising an image capture device configured to capture an image of the document; determine an error with the document; in response to determining the error with the document, trigger transmission of a signal to the image capture device; and modify a document image capture based on receiving the signal at the image capture device.

In one embodiment, the user device includes a document receiver in communication with the processing device, wherein the document receiver has a motor, and wherein the document receiver is configured to collect a document using the motor. In another embodiment, the processing device is further configured to execute the computer-readable program code to hold the document in the document receiver during an interaction with the user device, wherein holding the document comprises stopping the motor of the document receiver. In yet another embodiment, modifying the document image capture comprises controlling the motor to return the document held in the document receiver to a user. In yet another embodiment, the processing device is further configured to execute the computer-readable program code to: determine that a returned document has not been collected from the document receiver; collect the returned document using the document receiver; and store the returned document.

In yet another embodiment, modifying the document image capture comprises overriding the document image capture at the image capture device, wherein an image of the document is not stored.

In yet another embodiment, modifying the document image capture comprises storing an image of the document in a discrete storage location separate from other documents not associated with the error.

In yet another embodiment, the error comprises a document jam, a document rejection, a user canceling an interaction associated with the document, or a returned document not collected by the user.

In yet another embodiment, the user device is an automated teller machine.

A computer program product for selective document scanning and storage is also provided. The computer program product comprises a non-transitory computer-readable medium comprising computer-readable instructions, the computer-readable instructions, when executed by a processing device, cause the processing device to: receive a document via a user device comprising an image capture device configured to capture an image of the document; determine an error with the document; in response to determining the error with the document, trigger transmission of a signal to the image capture device; and modify a document image capture based on receiving the signal at the image capture device.

In one embodiment, the user device includes a document receiver in communication with the processing device, wherein the document receiver has a motor, and wherein the document receiver is configured to collect a document using the motor. In another embodiment, the computer-readable instructions, when executed by the processing device, cause the processing device to hold the document in the document receiver during an interaction with the user device, wherein holding the document comprises stopping the motor of the document receiver. In yet another embodiment, modifying the document image capture comprises controlling the motor to return the document held in the document receiver to a user. In yet another embodiment, the computer-readable instructions, when executed by the processing device, cause the processing device to: determine that a returned document has not been collected from the document receiver; collect the returned document using the document receiver; and store the returned document.

In yet another embodiment, modifying the document image capture comprises overriding the document image capture at the image capture device, wherein an image of the document is not stored.

In yet another embodiment, modifying the document image capture comprises storing an image of the document in a discrete storage location separate from other documents not associated with the error.

In yet another embodiment, the error comprises a document jam, a document rejection, a user canceling an interaction associated with the document, or a returned document not collected by the user.

In yet another embodiment, the user device is an automated teller machine.

A computer-implemented method for selective document scanning and storage is also provided. The computer-implemented method comprising: receiving a document via a user device comprising an image capture device configured to capture an image of the document; determining an error with the document; in response to determining the error with the document, triggering transmission of a signal to the image capture device; and modifying a document image capture based on receiving the signal at the image capture device.

In one embodiment, modifying the document image capture comprises overriding the document image capture at the image capture device, wherein an image of the document is not stored.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the invention, as described herein, leverage complex, specific-use computer system to provide a novel approach for selective document collection and processing. The present invention provides a system configured to receive a document from a user, determine an error with the received document, and in response trigger transmission of a signal to an image capture device to modify a document image based on determining the error associated with the received document. In one embodiment, the generated signal modifies the image capture device to override its normal function by preventing the device from capturing and/or storing an image of the document associated with the error. In this way, the system utilizes the image capture device and other devices associated with document collection, such as the receiver, in a nonconventional way to improve the function of document collection and processing systems by reducing the number of resources used to collect and process documents associated with errors.

Typically, document receiving devices automatically receive a document via a motorized document receiver and scan the received document with an image capture device for processing. In some cases, an error may occur while the document is received. For example, errors may include a document jam, a document rejection, a user canceling an interaction associated with the document, or a returned document not collected by the user. Existing systems typically attempt to scan and process these documents associated with errors which may lead to unnecessary use of resources. By enabling selective scanning and collection, documents received during an interaction associated with an error may, optionally, not be scanned and/or processed by the system thereby conserving resources and enhancing the operating efficiency of the system overall. In some cases, these errors may be intentionally induced by a user associated with attempted misappropriation. In these embodiments, the system may be enabled to modify a document image capture and document processing, wherein the documents associated with the intentional error may be processed or stored separate for additional reference if needed. In all embodiments, modification of a document image capture by the system includes the system controlling and image capture device and/or motors associated with a document receiver to alter conventional document collection and processing.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "resource" may refer to elements of one or more computing devices, networks, or the like available to be used in the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison). In some embodiments, a resource may further refer to manpower by one or more users of the system (e.g., employees operating or interacting with the system on behalf of a maintaining entity). In yet other embodiments, a resource may further refer to funds or data.

As used herein, the term "user" may refer to any entity or individual associated with the selective document collection and processing system. In some embodiments, a user may be a computing device user, a phone user, a mobile device application user, a customer of an entity or business, a system operator, and/or employee of an entity (e.g., a financial institution). In a specific embodiment, a user is a customer of an entity interacting with the entity via a user device to access an account. In some embodiments, identities of an individual may further include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, radio, global positioning system (GPS) devices, portable digital assistants (PDAs), pagers, mobile televisions, automated teller machines (ATMs), or any combination of the aforementioned. The device may be used by the user to access the system directly or through an application, online portal, internet browser, virtual private network, or other connection channel. In one embodiment, the selective document collection and processing system is in communication with one or more user devices.

As used herein, the term "entity" may be used to include any organization or collection of users that may interact with the selective document collection and processing system. An entity may refer to a business, company, or other organization that either maintains or operates the system or requests use and accesses the system. In a specific embodiment, the entity may be or associated with a financial institution. The terms "financial institution" and "financial entity" may be used to include any organization that processes financial transactions including, but not limited to, banks, credit unions, savings and loan associations, investment companies, stock brokerages, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system may be configured to reach out to the data source and watch, observe, or check the data source for changes, updates, variations, patterns, and the like. In other embodiments, a system may passively monitor a data source or data stream, wherein the data source or data stream provides information to the system and the system then watches, observes, or checks the provided information. In some embodiments, "monitoring" may further comprise analyzing or performing a process on something such as a data source or data stream either passively or in response to an action or change in the data source or data stream.

As used herein, an "interaction" may refer to any action or communication between one or more users, one or more entities or institutions, and/or one or more devices or systems within the system environment described herein. For example, an interaction may refer to a user interaction with a system or device, wherein the user interacts with the system or device in a particular way. An interaction may include user interactions with a user interface of a user application (e.g., clicking, swiping, drag-and-drop, toggling, text or data entry, etc.), authentication actions (e.g., signing-in, username and password entry, PIN entry, etc.), account actions or events (e.g., account access, fund transfers, document or record or document views, etc.) and the like. In another example, an interaction may refer to a user communication via one or more channels (i.e., phone, email, text, instant messaging, brick-and-mortar interaction, and the like) with an entity and/or entity system to complete an operation or perform an action with an account associated with user and/or the entity. In a specific embodiment, an interaction may comprise a transaction, exchange, or transmission of resources (e.g., funds or data (i.e., files)) between devices either directly or via an intermediate system. In a specific embodiment, an interaction may comprise a user providing a document to a device of the system environment described herein.

Figure 1:
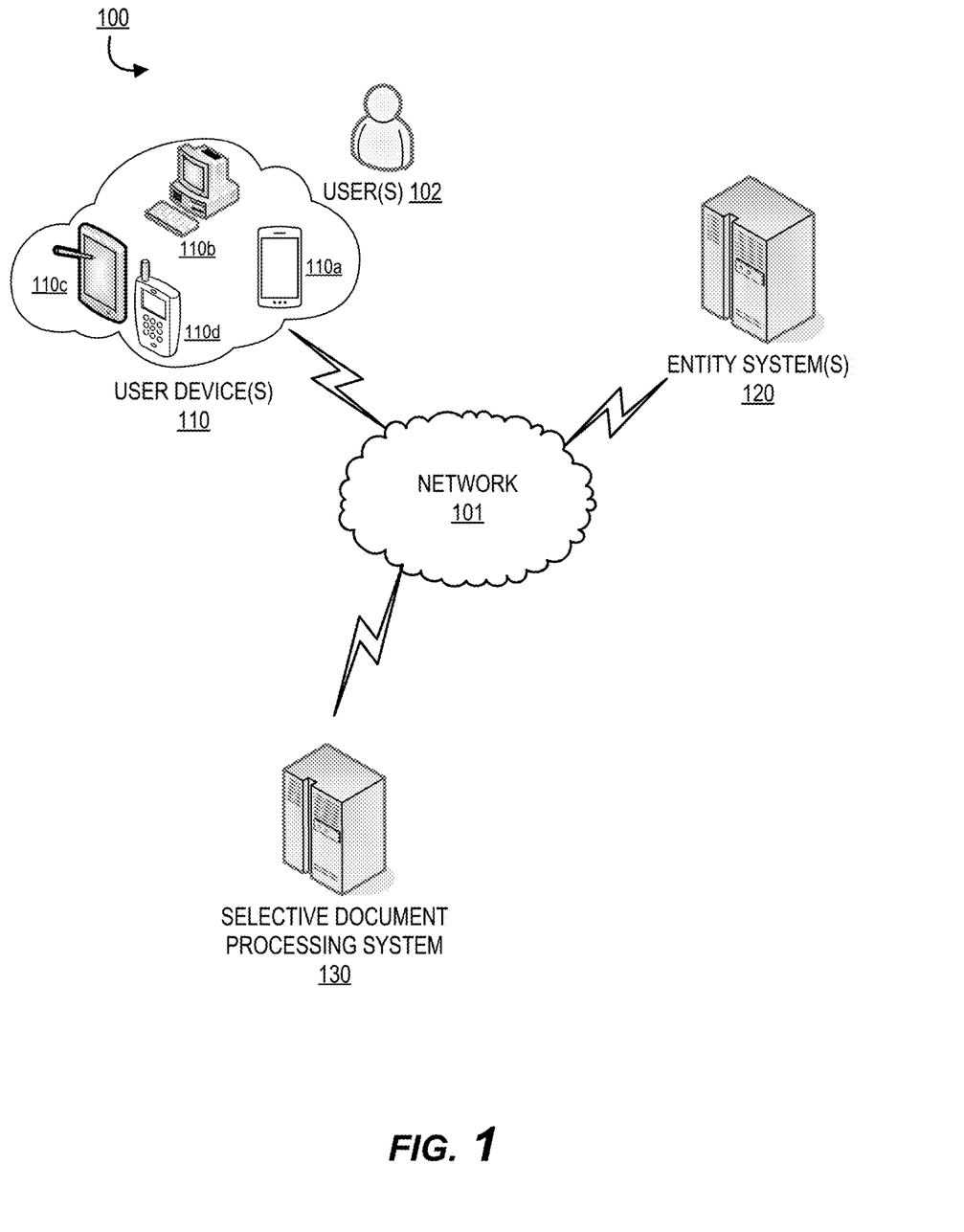
FIG. 1 provides a selective document processing environment, in accordance with one embodiment of the invention.

FIG. 1 provides an selective document processing environment 100, in accordance with one embodiment of the invention. As illustrated in FIG. 1, selective document processing system 130 is operatively coupled, via a network 101, to the user device(s) 110 (e.g., a plurality of user devices 110a-110d), and entity system(s) 120. In this way, the selective document processing system 130 can send information to and receive information from the user device 110, and the entity system. In the illustrated embodiment, the plurality of user devices 110a-110d provide a plurality of communication channels through which the entity system 120 and/or the selective document processing system 130 may communicate with the user 102 over the network 101.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual interacting with one or more entity systems 120 and/or other user devices via a user device 110 while a data stream or flow between the user device 110 and the entity system 120 and/or other user devices is intercepted and monitored by the selective document processing system 130 over the network 101. In some embodiments a user 102 is a user requesting service from the entity or interacting with an account maintained by the entity system 120. In an alternative embodiment, the user 102 is an individual interacting with the selective document processing system 130 over the network 101 and monitoring input of information from the entity systems 120 to and from the application construction system 130 for processing and analysis (e.g., an employee of the entity operating and/or monitoring the systems 120, 130). In an alternative example, the interaction may be processed through another system such as entity system 120 and/or selective document processing system 130. In one embodiment, the user 102 is a customer providing a document to a user device such as an ATM maintained by the entity system 120 to be processed by the selective document processing system 130.

Figure 2:
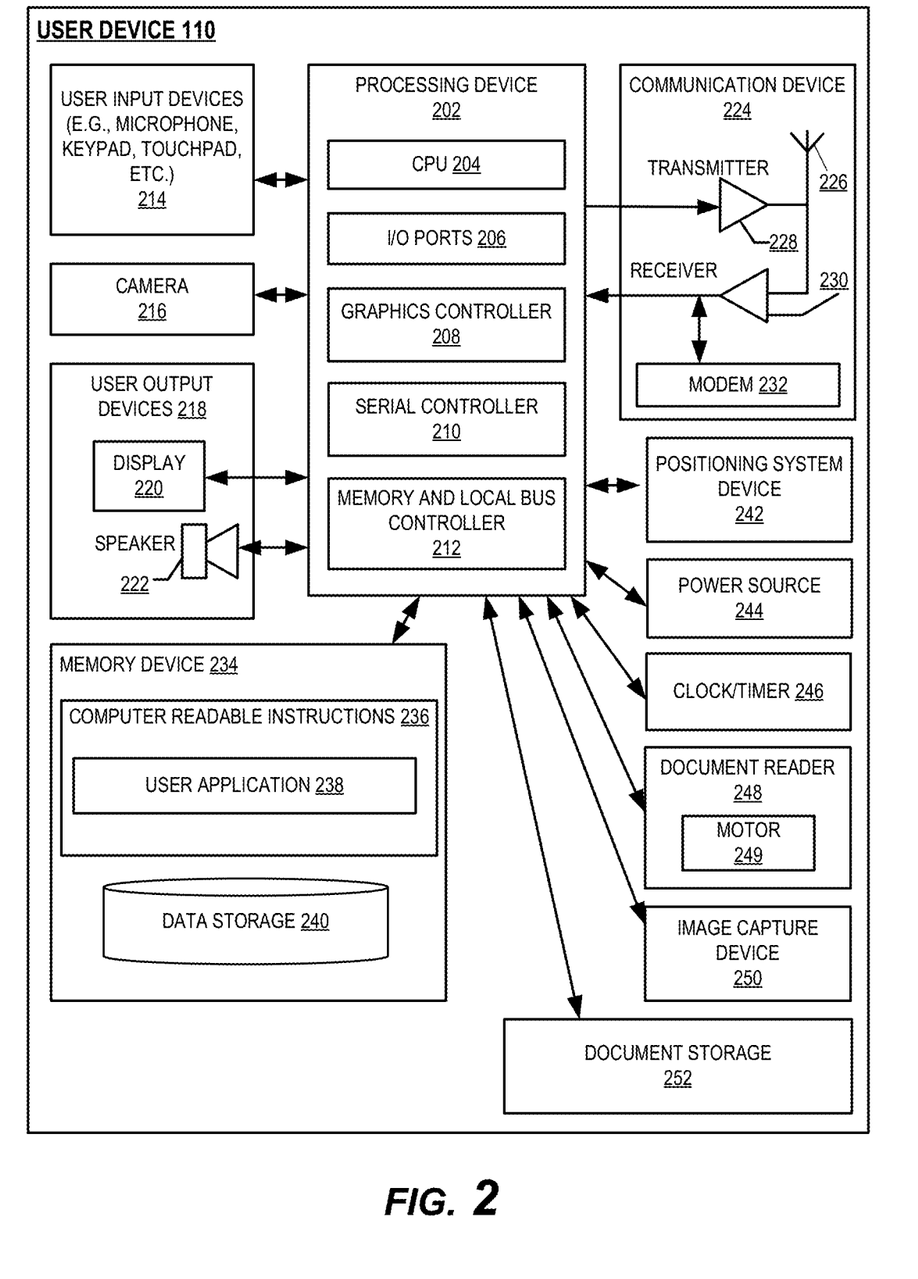
FIG. 2 provides a block diagram of a user device, in accordance with one embodiment of the invention.

FIG. 2 provides a block diagram of a user device 110, in accordance with one embodiment of the invention. The user device 110 may generally include a processing device or processor 202 communicably coupled to devices such as, a memory device 234, user output devices 218 (e.g., a user display device 220, or a speaker 222), user input devices 214 (e.g., a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, a document image capture device 250, a document reader 248 including a motor 249 (i.e., for receiving a document), and document storage. In one embodiment, the document image capture device 250 may include a scanner, barcode reader, or any other image capturing device or sensor configured to capture an image of a document. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120 and/or selective document processing system 130. In one embodiment, the user application 238 may be configured to allow a user 102 to request, initiate, and/or receive an interaction with another device or system. In some embodiments, a user application 238 may be configured to allow a user to interact with the selective document processing system 130 to manage stored documents.

The processing device 202 may be configured to use the communication device 224 to communicate with one or more other devices on a network 101 such as, but not limited to the entity system 120 and the selective document processing system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, the one or more applications 238 are loaded into the temporary memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Figure 3:
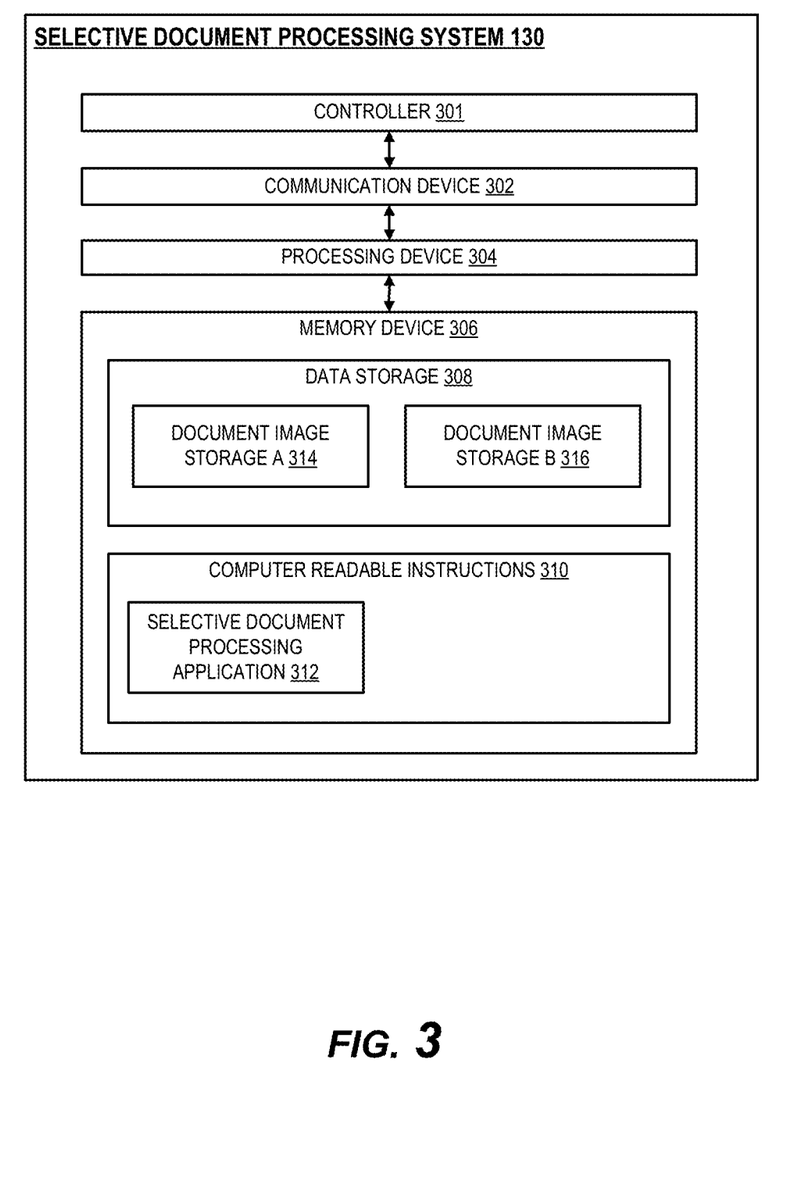
FIG. 3 provides a block diagram of a selective document processing system, in accordance with one embodiment of the invention.

FIG. 3 provides a block diagram of a selective document processing system 130, in accordance with one embodiment of the invention. The selective document processing system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, and/or the selective document processing system 130, in order to interface and manage data flow between systems while executing commands to control the systems. In some embodiments, the controller 301 may be integrated into or be placed in one or more of the systems described herein. In other embodiments, the controller 301 may be a separate system or device. In some embodiments, the controller 301 may perform one or more of the processes, actions, or commands described herein.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110, and/or the entity system 120. As such, the communication device 302 generally comprises a modem, server, or other device for communicating with other devices on the network 101.

As further illustrated in FIG. 3, the selective document processing system 130 comprises computer-readable instructions 310 stored in the memory device 306, which in one embodiment includes the computer-readable instructions 310 of a selective document processing application 312. The selective document processing application 312 may be configured to determine document errors and whether to scan and process a received document by modifying a document image capture.

In some embodiments, the memory device 306 includes data storage 308 for storing data related to the system environment, but not limited to data created and/or used by the selective document processing application 312. Data stored in the data storage 308 may comprise document image storage 314 and 316. In one embodiment, document image storage A 314 is separately stored from document image storage B 316. The system may be configured to separately store images of documents associated with an error from images of documents not associated with an error. In this way, in some embodiments, resources may be focused only on documents not associated with errors.

In one embodiment of the invention, the selective document processing system 130 may associate with applications having computer-executable program code that instruct the processing device 304 to perform certain functions described herein. In one embodiment, the computer-executable program code of an application associated with the user device 110 and/or the entity systems 120 may also instruct the processing device 304 to perform certain logic, data processing, and data storing functions of the application.

Embodiments of the selective document processing system 130 may include multiple systems, servers, computers or the like maintained by one or many entities. In some embodiments, the selective document processing system 130 may be part of the entity systems 120. In other embodiments, the entity systems 120 are distinct from the selective document processing system 130. The selective document processing system 130 may communicate with the entity systems 120 via a secure connection generated for secure encrypted communications between the two systems either over the network 101 or alternative to the network 101.

Figure 4:
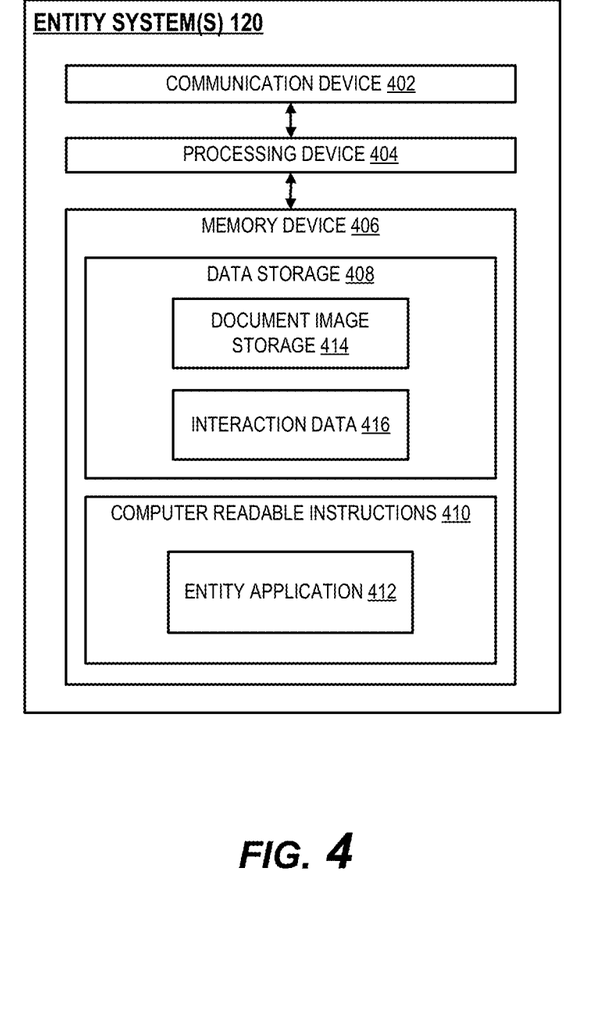
FIG. 4 provides a block diagram of an entity system, in accordance with one embodiment of the invention.

As illustrated in detail in FIG. 4, the environment 100 further includes one or more entity systems 120 which are connected to the user device 110 and the selective document processing system 130. The entity systems 120 may be associated with one or more entities, institutions or the like, such as an entity maintaining the selective document processing system 130. The entity systems 120 generally comprise a communication device 402, a processing device 404, and a memory device 406 further comprising data storage 408. The entity systems 120 comprise computer-readable instructions 410 stored in the memory device 406, which in one embodiment includes the computer-readable instructions of an entity application 412. The entity systems 120 may communicate with the user device 110 and the selective document processing system 130 to provide access to accounts, resources, data (e.g., document images) stored and maintained on the entity systems 120. In some embodiments, the entity system 120 may communicate with the selective document processing system 130 during an interaction with a user 102 in real-time, wherein user interactions may be monitored and processed by the selective document processing system 130. In some embodiments, data storage 408 comprises document image storage 414 to either supplement or replace similar data storages or databases on the selective document processing system 130 as previously discussed. Data storage 408 may further comprise interaction data 416 which may include historical interaction data and stored document images associated with one or more users.

Figure 5:
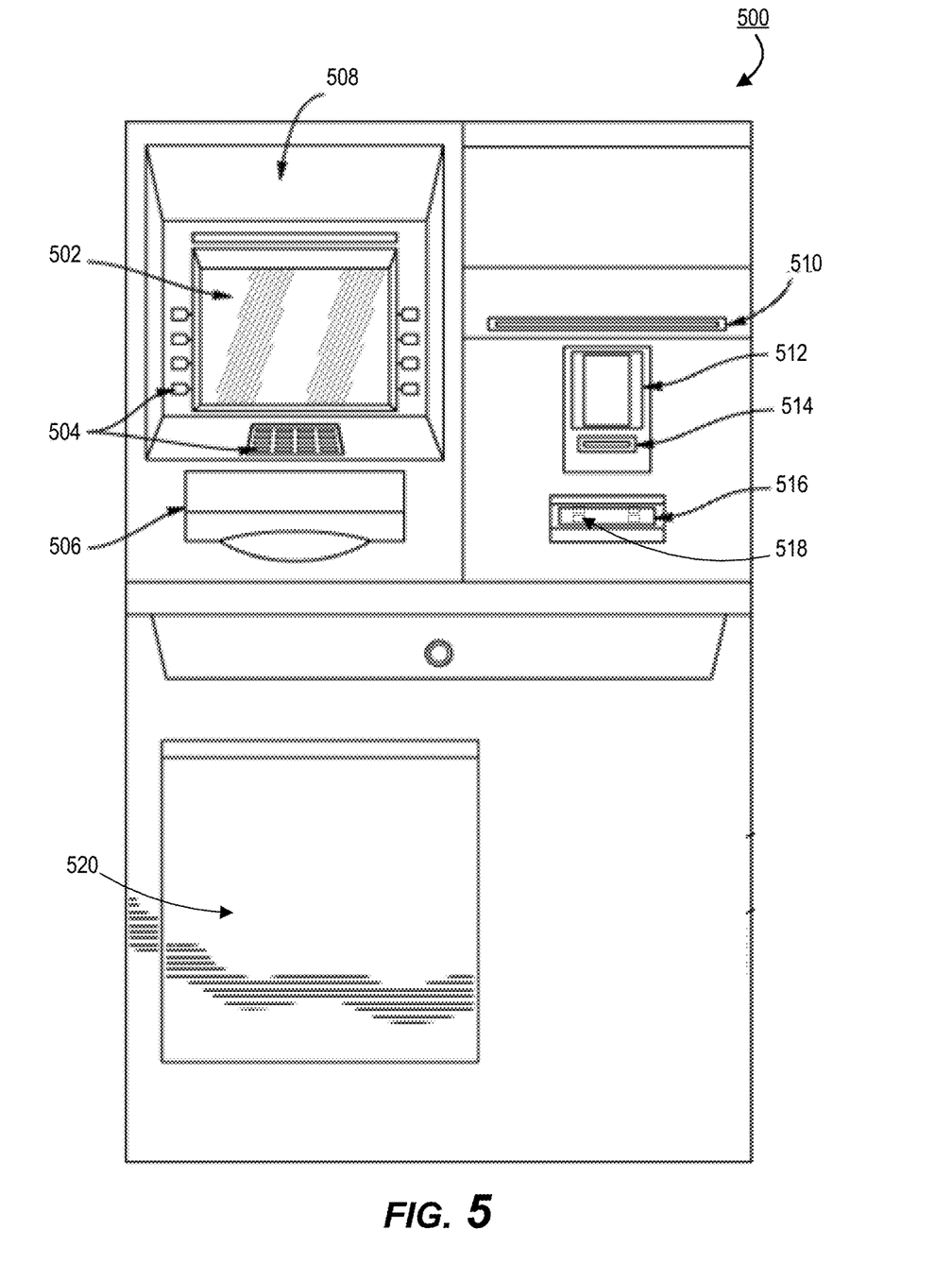
FIG. 5 provides an illustration of a user device for document collection, in accordance with one embodiment of the invention.

FIG. 5 provides a representative illustration of a user device for document collection, in accordance with one embodiment of the invention. In the embodiment illustrated in FIG. 5, the user device for document collection is represented as an ATM 500. While an ATM is presented in FIG. 5, the user device may be an ATM, transaction device, kiosk, terminal, merchant location, online interface, or the like.

FIG. 5 provides a representative illustration of an ATM 500, in accordance with one embodiment of the present invention. In some embodiments, the representative ATM may comprise features similar to features found on a standard ATM. The lighting means 508 may be located above the display 502 that may provide a customer light for use during an ATM transaction. Of note, the display 502 may be vertically adjusted or horizontally adjusted along tracks or the like to position itself across the entire ATM 500. While currently illustrated in the upper left corner of the ATM 500, one will appreciate that the display may move to the right upper corner or below to the lower corners of the ATM 500 and/or anywhere in between if necessary. The lighting means 508 may also be moved with the ATM display 502 and provide the customer a safety mechanism to aid in the ATM transaction. The display 502 provides a means for displaying information related to the customer's ATM transaction. Display information may be, but is not limited to display of interfaces, such as the start-up interface and an ATM transaction interface. In some embodiments, the display 502 is a touch screen display module.

The cash receptacle 506 may provide the customer means for receiving cash that the customer requests for a withdraw through the ATM transaction. In some embodiments, the ATM 500 may also include a contactless identification sensor 512, a contact identification sensor 514 such as a debit or ATM card acceptor, a keypad 504, a receipt receptacle 510, and a deposit receptacle 516. In some embodiments, the deposit receptacle 516 may be configured for receiving one or more documents (e.g., checks) from the user. The deposit receptacle 516 may be a motorized document receiving device comprising motorized rollers 518. In some embodiments, the motorized rollers 518 and associated motor may be controlled by the selective document processing system 130 described above. In some embodiments, the deposition receptacle 516 includes an image capture device inside the interior of the receptacle for scanning received documents and capturing images for further processing.

In some embodiments, the contactless identifier 512 and/or the contact identifier 514 may provide the ATM 500 means of receiving identification from the customer. The customer may provide contactless or contact identification means through the ATM 500. The identification means using the contactless or contact identifications may be provided through several mechanisms, including, but not limited to, biometric identification, laser identification, magnetic strip identification, barcode identification, radio frequency (RF), a character recognition device, a magnetic ink, code readers, wireless communication, debit card scanning, ATM card scanning, and/or the like. The authentication from the contactless identifier of contact identifier may be read by the ATM application. After the authentication has been read, the system may provide the authentication to the financial institution to authorize an ATM transaction.

In some embodiments, the keypad 504 may provide for identification of the customer for use of the ATM 500. The keypad 504 may provide the customer means for inputting a pin number identification. In this way, the keypad 504 enables the customer to input a pin number into the ATM 500. In some embodiments, the pin number inputted on the keypad 504 may be read by the system. After the pin number has been read, the ATM 500 may receive the pin number and provide authentication of the identification with the financial institution system.

Figure 6:
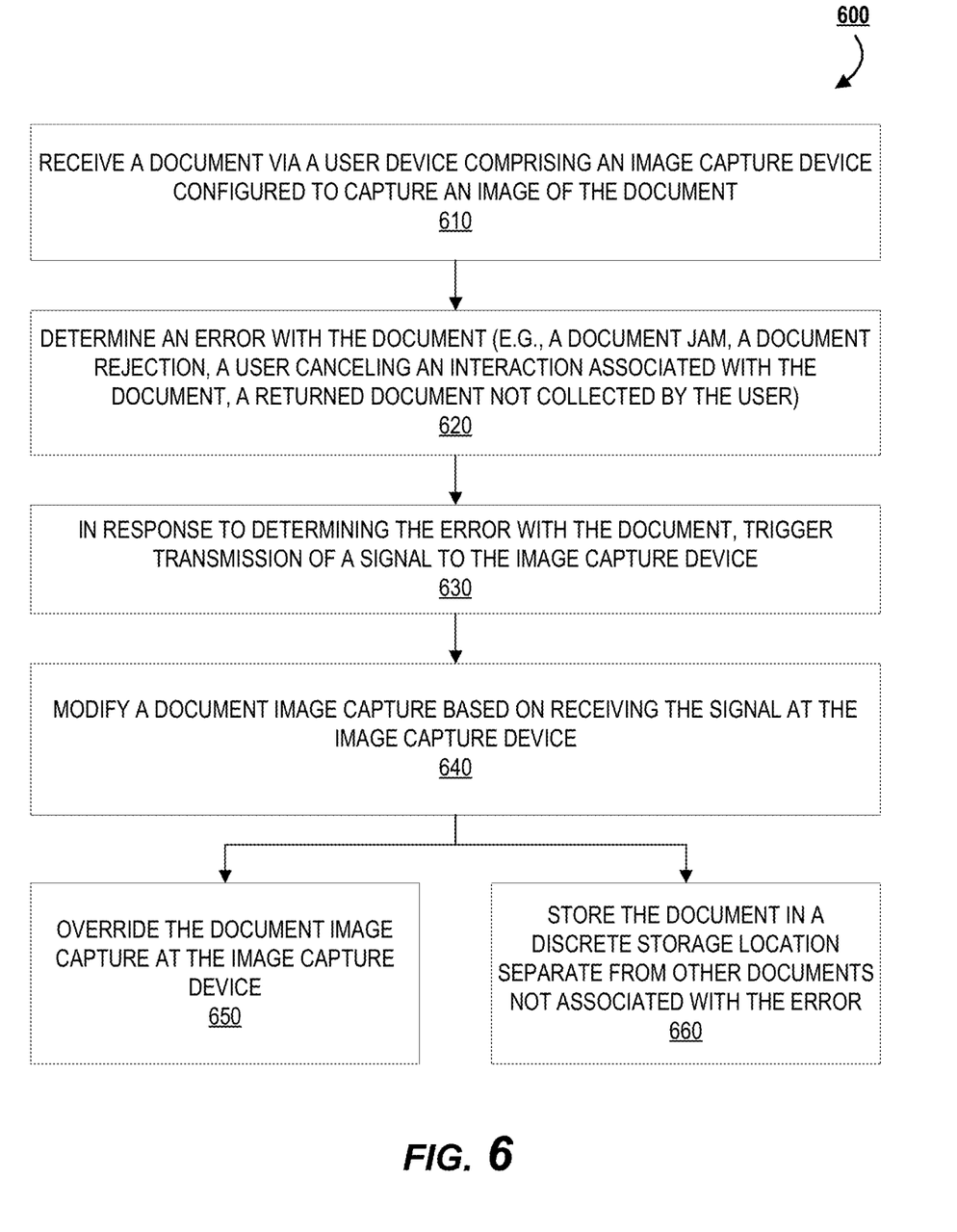
FIG. 6 provides a high level process flow for selectively processing a document, in accordance with one embodiment of the invention.

FIG. 6 provides a high level process flow for selectively processing a document, in accordance with one embodiment of the invention. As illustrated in block 610 of the process flow 600, the system first receives a document via a user device. As previously discussed, in one embodiment, the user device is an ATM, wherein a user is depositing a document, such as a check, into an account of a financial institution via the ATM. The document may be received via an electronic document receiver of the user device such as a slot having means for transporting the received document into and through the slot and throughout the user device for storage (e.g., a bill or document acceptor). For example, as illustrated in FIG. 5, the document receiver may have motorized pinch wheels or the like for contacting and drawing a received document into the user device. While a document such as a check being deposited into an ATM is described herein with respect to the process flows, it should be understood that other documents and/or other user devices are envisioned as well.

In some embodiments, the user device comprises an image capture device configured to capture an image of the received document after it has been inserted and drawn into the document receiver and the user device. An image capture device may comprise a camera, a scanner, or the like configured to capture an image of the received document for additional processing. In some embodiments, after an image of the document is captured, the image may be stored by the system, such as in the user device 110, entity system 120, and/or selective document processing system 130. In some embodiments, after an image of the document is captured, the received document is stored by the user device such as in document storage 252, 520. In other embodiments, a received document may be returned to the user via the document receiver.

Conventional user devices and document collection and processing systems are configured to receive and accept a document for processing after document collection regardless of actions performed by the user during the interaction associated with the received document. As a result, these conventional systems may attempt to scan and/or process a received document even when presented with an error associated with the document during the interaction. For example, in some embodiments, a document error may comprise a document jamming in the document receiver (e.g., the document and/or document receiver is stuck or the document receiver is unable to move the document through), a document being rejected by the system (e.g., unable to identify or read the document), or an interaction associated with the document being canceled by the user after the document has been received. In another embodiment, an error may further comprise a document returned to the user via the document receiver not being collected back by the user leading to exposure of the document.

In contrast with conventional user devices, such as ATMs, the present invention overrides typical device operation in response to determined document errors and modifies document image collection by the image capturing device. As illustrated in block 620, the system determines an error with the document. As discussed above an error may comprise, for example, a document jam, a document rejection, a user canceling an interaction associated with the document, a returned document not collected by the user, or other event that prevents normal processing of the document by the system. In some embodiments, an error may be detected and determined by the document receiver of the user device. For example, the document receiver may be configured to detect a document jam or the presence of returned document in the document receiver. In other embodiments, the system may be configured to determine an error with a received document. For example, the system may receive a cancel command for the interaction from a user via a user interface of the user device thereby canceling the interaction. In yet another example, the system may determine when to reject a receive document, for example, due to incorrect information provided on the document, an unrecognized document, not enough resources in stored in a resource location (i.e., an account) associated with the interaction, or the like.

As illustrated in block 630, in response to determining an error with the received document, the system triggers transmission of a signal to the image capture device to modify a document image capture based on receiving the signal at the image capture device as illustrated in block 640. This step of process 600 is in contrast with conventional device operation. Instead of automatically capturing and storing an image of the receive document and thereby needing to expend resources to then process the image and/or document, the present invention modifies a document image capture based on first determining an error.

As illustrated in block 650, in some embodiments, modifying the document image capture may comprise the system overriding the document image capture at the image capture device. In this way, an image of the received document associated with the error is never captured by the user device. As such, the user device and system are not required to expend additional resources storing and processing a document image unnecessarily. Instead resource may be focused on processing only those documents associated with error-free interactions. In another embodiment, the code of the user device, such as an ATM, is modified by the system, wherein a trigger is inserted into the code of the user device to not capture an image of the document if the user cancels the interaction and/or requests that the document be returned. In another embodiment, the system may be configured to capture an image of the received document, but not generate a digital image to be further processed by the system. In this way, the system may still inspect a received document with an image capture device.

As an alternative or additive process, as illustrated in block 660, modifying the document image capture may further comprise the system storing a received document associated with an error in a discrete storage location separate from other documents not associated with the error. In this way documents associated with errors may still be tracked while being held separately quarantined from other documents not associated with errors. As such the system may focus on processing only those document not associated with errors instead of dedicating additional time and resources simultaneously processing documents associated with errors. In some embodiments, the system may be configured to mark or modify an image of a document associated with an error for later reference.

Figure 7:
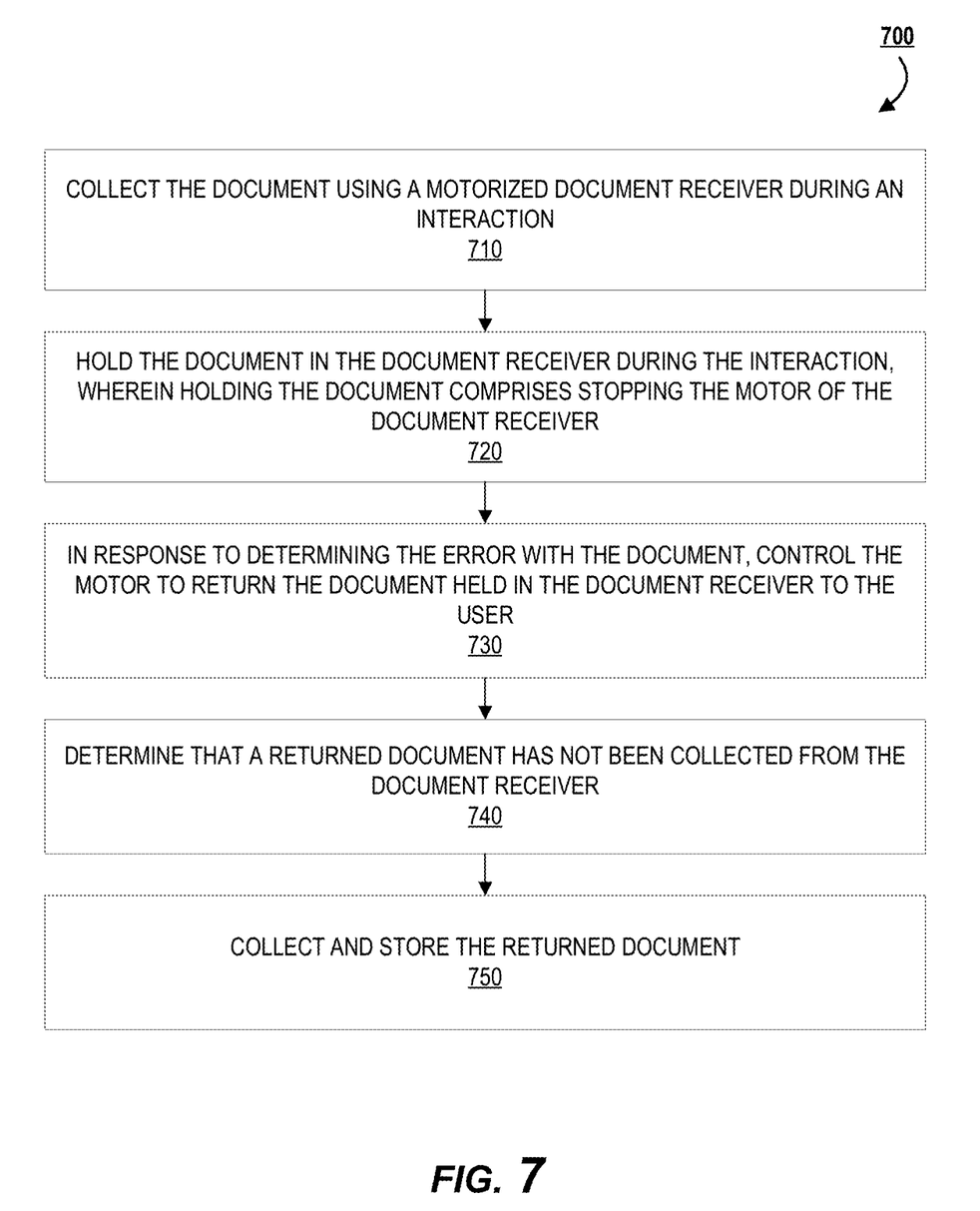
FIG. 7 provides a high level process flow for collecting and storing a document, in accordance with one embodiment of the invention.

In contrast to conventional systems and devices, the present invention does not immediately fully scan, process, and store a received document regardless of errors. Instead, the present system selectively collects and processes documents and/or document images which is enabled through a modified document collection process and document receiver control. FIG. 7 provides a high level process flow for collecting and storing a document, in accordance with one embodiment of the invention. As previously discussed with respect to FIG. 6, the system collects a document using a motorized document receiver during an interaction as illustrated in block 710. For example, the system may control motorized rollers 518 in a document receiver slot 516 for collecting a document. That said unlike conventional systems, as illustrated in block 720, the system holds the document in the document receiver during the interaction instead of fully scanning, processing, and storing the document and/or associated image. In some embodiments, the system may only capture and store an image of the receive document upon successful completion of an associated interaction (e.g., funds deposit or withdrawal). In some embodiments, the system is configured to hold the document by controlling the document receiver and stopping the motor of the motorized wheels. In some embodiments, the system transmits a control signal to override operation of the motorized document receiver to hold the document.

As previously discussed, the system may be configured to determine an error with a received document while the document is being held in the document receiver. In some embodiments, an error may be determined before an image of the document is captured, processed, and/or stored by the system. In the embodiment of FIG. 7, in block 730, in response to determining an error with a document, the system controls the motor of the document receiver to return the document held int her document receiver to the user. The document receiver is configured to reverse direction of document receiving means (e.g., motorized pinch wheels) to present the user with the document.

In some embodiments, a user may either intentionally or unintentionally not collect the returned document after it has been presented back to the user. As illustrated in block 740, the system may determine that a returned document has not been collected from the document receiver. In response, the system is configured to collect and store the returned document as illustrated in block 720. The system may be configured to automatically retract a returned document after a predetermined amount of time without the returned document being collected by the user. In another embodiment, a user device may be configured (e.g., via camera 216) that the user has left the user device without collecting the returned document, and in response, collected and store the returned document to prevent document exposure. In some embodiments, the collected returned document is stored separately from other documents not associated with an error for additional processing.

In some embodiments of the invention, the system may be configured to modify a document image collection to improve document processing security and preventing attempted misappropriation by users. In some attempted misappropriation situations, a user may cancel an interaction after a document has been received, intentionally jam the document receiver in an attempt to recover a provided document, hold the document receiver open, forcibly withdraw a document from the document receiver, or the like. The user may then attempt to claim an error in processing of the document (i.e., a deposit of funds) while retaining the document and insist that the previous interaction be honored while the maintaining entity takes fault for previous processing error.

In some embodiments, the present invention may be configured to capture and store an image of the document associated with the attempted misappropriation. The image may be retained in a separate database and be provided to an entity associate that later encounters the user during attempted misappropriation. In some embodiments, the system may be configured to mark or flag an image of a document as being associated with suspected misappropriation. In another embodiment, the system may place a hold on a resource associated with a document that is suspected of being associated with attempted misappropriation.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with selective document scanning and storage.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for selective document scanning and storage, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for selective document scanning and storage, the system comprising:
    a memory device with computer-readable program code stored thereon;
    a communication device connected to a network; and
    a processing device, wherein the processing device is configured to execute the computer-readable program code to:
        receive, during an interaction with a user, a document via an automated teller machine, wherein the automated teller machine comprises a document receiver for collecting documents and an image capture device, and wherein the automated teller machine is configured to, based on receiving the document, perform document image collection by automatically capturing, with the image capture device, an image of the document, automatically storing the image of the document, and automatically processing the image of the document;
        receive, from the user via a user interface of the automated teller machine and after receiving the document, a cancel command for the interaction;
        in response to receiving the cancel command;
            capture, via the image capture device, an image of the document;
            mark, via the automated teller machine, the image of the document as being associated with suspected misappropriation;
            store the marked image of the document in a database separate from other documents not associated with the interaction;
            place a hold on a resource associated with the document;
            control the document receiver to return the document to the user;
            determine, via a camera and after returning the document to the user, that the user has left the automated teller machine without collecting the document; and
            in response to determining that the user has left the automated teller machine without collecting the document:
                control the document receiver to collect the document; and
                store the document in a discrete storage location, within the automated teller machine, that is separate from other documents not associated with the interaction; and
        provide, during another interaction with the user, the marked image of the document from the database to an entity associate.

2. The system of claim 1, wherein the document receiver has a motor, and wherein the document receiver is configured to collect the documents using the motor.

3. The system of claim 2, wherein the processing device is further configured to execute the computer-readable program code to hold the document in the document receiver during the interaction with the automated teller machine, wherein holding the document comprises stopping the motor of the document receiver.

4. The system of claim 1, wherein the processing device is configured to execute the computer-readable program code to detect at least one of a document jam or a document rejection.

5. The system of claim 1, wherein the processing device is configured to execute the computer-readable program code to:
    determine that incorrect information is provided on the document; and
    in response to determining that incorrect information is provided on the document, reject the document.

6. The system of claim 1, wherein the processing device is configured to execute the computer-readable program code to:
    determine that not enough resources are stored in a resource location associated with the interaction; and
    in response to determining that not enough resources are stored in a resource location associated with the interaction, reject the document.

7. A computer program product for selective document scanning and storage, wherein the computer program product comprises a non-transitory computer-readable medium comprising computer-readable instructions, the computer-readable instructions, when executed by a processing device, cause the processing device to:
receive, during an interaction with a user, a document via an automated teller machine, wherein the automated teller machine comprises a document receiver for collecting documents and an image capture device, and wherein the automated teller machine is configured to, based on receiving the document, perform document image collection by automatically capturing, with the image capture device, an image of the document, automatically storing the image of the document, and automatically processing the image of the document;
receive, from the user via a user interface of the automated teller machine and after receiving the document, a cancel command for the interaction;
in response to receiving the cancel command;
capture, via the image capture device, an image of the document;
mark, via the automated teller machine, the image of the
store the marked image of the document in a database separate from other documents not associated with the interaction;
place a hold on a resource associated with the document;
control the document receiver to return the document to the user;
determine, via a camera and after returning the document to the user, that the user has left the automated teller machine without collecting the document; and
in response to determining that the user has left the automated teller machine without collecting the document:
control the document receiver to collect the document; and
store the document in a discrete storage location, within the automated teller machine, that is separate from other documents not associated with the interaction; and
provide, during another interaction with the user, the marked image of the document from the database to an entity associate.

8. The computer program product of claim 7, wherein the document receiver has a motor, and wherein the document receiver is configured to collect the documents using the motor.

9. The computer program product of claim 8, wherein the computer-readable instructions, when executed by the processing device, cause the processing device to hold the document in the document receiver during the interaction with the automated teller machine wherein holding the document comprises stopping the motor of the document receiver.

10. The computer program product of claim 7, wherein the computer-readable instructions, when executed by the processing device, cause the processing device to detect at least one of a document jam or a document rejection.

11. The computer program product of claim 7, wherein the computer-readable instructions, when executed by the processing device, cause the processing device to:
determine that incorrect information is provided on the document; and
in response to determining that incorrect information is provided on the document, reject the document.

12. The computer program product of claim 7, wherein the computer-readable instructions, when executed by the processing device, cause the processing device to:
determine that not enough resources are stored in a resource location associated with the interaction; and
in response to determining that not enough resources are stored in a resource location associated with the interaction, reject the document.

13. A computer-implemented method for selective document scanning and storage, the computer-implemented method comprising:
receiving, during an interaction with a user, a document via an automated teller machine, wherein the automated teller machine comprises a document receiver for collecting documents and an image capture device, and wherein the automated teller machine is configured to, based on receiving the document, perform document image collection by automatically capturing, with the image capture device, an image of the document, automatically storing the image of the document, and automatically processing the image of the document;
receiving, from the user via a user interface of the automated teller machine and after receiving the document, a cancel command for the interaction;
in response to receiving the cancel command;
capturing, via the image capture device, an image of the document;
marking, via the automated teller machine, the image of the document as being associated with suspected misappropriation;
storing the marked image of the document in a database separate from other documents not associated with the interaction;
placing a hold on a resource associated with the document;
controlling the document receiver to return the document to the user;
determining, via a camera and after returning the document to the user, that the user has left the automated teller machine without collecting the document; and
in response to determining that the user has left the automated teller machine without collecting the document:
controlling the document receiver to collect the document; and
storing the document in a discrete storage location, within the automated teller machine, that is separate from other documents not associated with the interaction; and
providing, during another interaction with the user, the marked image of the document from the database to an entity associate.

14. The method of claim 13, wherein the document receiver has a motor, and wherein the document receiver is configured to collect the documents using the motor.

15. The method of claim 14, comprising holding the document in the document receiver during the interaction with the automated teller machine, wherein holding the document comprises stopping the motor of the document receiver.

16. The method of claim 13, comprising detecting at least one of a document jam or a document rejection.

17. The method of claim 13, comprising:
determining that incorrect information is provided on the document; and in response to determining that incorrect information is provided on the document, rejecting the document.

18. The method of claim 13, comprising:

determining that the document is an unrecognized document; and in response to determining that the document is an unrecognized document, rejecting the document.

19. The method of claim 13, comprising:

determining that not enough resources are stored in a resource location associated with the interaction; and in response to determining that not enough resources are stored in a resource location associated with the interaction, rejecting the document.

20. The method of claim 13, comprising, after returning the document to the user and after a predetermined amount of time without the document being collected by the user, retracting the document.

\* \* \* \* \*